United States Patent
Haddad

(10) Patent No.: US 7,545,621 B2
(45) Date of Patent: Jun. 9, 2009

(54) ELECTROSTATIC DISCHARGE STRUCTURE FOR A BIOMETRIC SENSOR

(75) Inventor: Waleed Haddad, San Francisco, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 429 days.

(21) Appl. No.: 11/459,403

(22) Filed: Jul. 24, 2006

(65) Prior Publication Data

US 2008/0075339 A1 Mar. 27, 2008

(51) Int. Cl.
*H01H 47/00* (2006.01)
*H01T 23/00* (2006.01)

(52) U.S. Cl. ...................................... 361/220; 361/230
(58) Field of Classification Search ................. 361/220, 361/230
See application file for complete search history.

(56) References Cited

U.S. PATENT DOCUMENTS

| | | | |
|---|---|---|---|
| 4,353,056 A | 10/1982 | Tsikos | |
| 5,991,145 A * | 11/1999 | Lagrotta et al. | 361/212 |
| 6,114,862 A | 9/2000 | Tartagni et al. | |
| 6,246,566 B1 * | 6/2001 | Glenn | 361/220 |
| 6,289,114 B1 | 9/2001 | Mainguet | |
| 6,330,145 B1 * | 12/2001 | Lepert et al. | 361/220 |
| 6,515,488 B1 | 2/2003 | Thomas | |
| 6,610,555 B1 | 8/2003 | Bryant et al. | |
| 6,628,812 B1 | 9/2003 | Setlak et al. | |
| 6,686,546 B2 * | 2/2004 | Chiu | 178/18.01 |
| 6,737,329 B2 | 5/2004 | Lepert et al. | |
| 6,819,784 B1 | 11/2004 | Sabatini et al. | |
| 6,900,644 B2 | 5/2005 | Chou et al. | |
| 6,987,871 B2 | 1/2006 | Kalnitsky et al. | |
| 7,009,410 B2 | 3/2006 | Ito et al. | |
| 7,027,625 B2 | 4/2006 | Greschitz et al. | |
| 2003/0076649 A1 | 4/2003 | Speakman | |
| 2006/0011997 A1 | 1/2006 | Kalnitsky et al. | |
| 2006/0062437 A1 | 3/2006 | O'Gorman et al. | |

* cited by examiner

*Primary Examiner*—Ronald W Leja
(74) *Attorney, Agent, or Firm*—Pepper Hamilton LLP

(57) ABSTRACT

A structure for reducing or eliminating electrostatic discharge from a finger into the platen of a biometric sensor is disclosed. The structure is designed to be positioned above and around the platen such that conductive components in the structure stimulate corona discharge and dielectric breakdown from an approaching finger into the conductive components of the structure rather than into the platen itself. The structure is designed to eliminate, reduce or otherwise neutralize the charge on an approaching finger prior to the finger coining into contact with the platen of the biometric sensor and prior to the finger coming close enough to the platen so that the electrostatic discharge causes an arc to strike the platen.

21 Claims, 8 Drawing Sheets

~605

~610

~615

ELECTROSTATIC DISCHARGE STRUCTURE FOR A BIOMETRIC SENSOR

BACKGROUND

Fingerprint detection has long been used as a method of identification. In the time that fingerprints have been examined and compared, no two areas of friction ridge skin on any two fingers or palms have been found to have the same friction ridge characteristics. As such, fingerprinting has been accepted as a primary method of identifying an individual.

Although fingerprinting was initially used for forensic purposes, computerized identification, verification and authentication systems that utilize the digital analysis of fingerprints have been developed more recently to protect personal property such as laptops, computers and cellular phones, prevent credit card and calling card fraud, limit access to secure computers, information and areas, and ensure security for network based financial transactions.

The technology for the actual scanning or sensing of fingerprints has also advanced over time. For example, ink roller methods were replaced with optical and mechanical sensing technologies. Such technologies generally used scanners or cameras to capture a fingerprint image and then digitize the image for subsequent processing. One problem with such technologies is that the lighting conditions available at the time of image capture can affect the quality of the resulting fingerprint image.

More recently, capacitive fingerprint sensors have been introduced. Such sensors are typically silicon semiconductor-based devices that have an array of capacitor electrodes covered by a protective coating at the surface of the sensor (i.e., the platen). The sensor detects varying capacitor charges that correspond to die distance between the ridges and valleys of a, fingerprint and the electrodes when a finger is pressed against the platen. These measurements are then converted into a digital image of the fingerprint. An early capacitive fingerprint sensor is disclosed in U.S. Pat. No. 4,353,056 to Tsikos, which is incorporated herein by reference in its entirety.

One issue with capacitive fingerprint sensors is that placing a linger that holds a sufficient level of electrostatic charge onto the sensor has the potential to significantly damage sensitive electronic components in the sensor, other electronic components coupled to the sensor (including circuitry in any authentication computer systems coupled to the sensor) or otherwise interfere or affect the operation of the sensor. This effect is known as electrostatic discharge ("ESD"). Conventionally, sensor manufacturers have sought to control ESD by placing electrodes or an internal metal grid underneath the sensor to dissipate electrostatic charge received from a finger. Exemplary patents incorporating such methods include U.S. Pat. No. 6,628,812 to Setlak et al. and U.S. Pat. No. 6/737,329 to Lepert et al, each of which is incorporated herein by reference in its entirety. However, such methods do not reduce the electrostatic charge received at the surface of sensors. As such, despite the potential of such electrodes or metal grids to distribute or dissipate current once the finger contacts the surface of the sensor, substantial ESD effect or damage may still occur to any sensitive components in the sensor that tire not in adequate proximity to the electrodes or grid. In particular, sensors placed in environments that have the potential to produce ESD finger events that result in high voltages (e.g., greater than 12 kV) may not be adequately protected by such conventional solutions. What is therefore needed is a structure or architecture where ESD is dissipated prior to contact by the finger with the platen.

SUMMARY

The present disclosure relates to a structure for dissipating ESD from a finger approaching the platen of a fingerprint sensor prior to the finger's contact with the platen. Such a structure reduces the risk that sensitive electronic components within the fingerprint sensor or coupled to the sensor are damaged or otherwise cease to function properly.

In particular, the present disclosure describes an apparatus that comprises a raised molded structure that surrounds or is otherwise proximate to the platen, wherein an initial distance between the approaching finger and the internal sides of the raised molded structure is less than the distance between the area on the approaching finger and the platen. Given its shorter distance to the approaching finger, conductive structures within the raised molded structure will he able to stimulate or otherwise encourage electrostatic activity prior to the conductive traits of the platen doing so itself. The apparatus also includes a frame for the aforementioned conductive structures, wherein the frame is affixed underneath the raised molded structure and connected to ground and the conductive structures are positioned in a manner such that their end portions are substantially flush against (e.g., almost protruding completely through) the surface, of the raised molded structure.

BRIEF DESCRIPTION OF THE DRAWINGS

Aspects, features, benefits and advantages of the disclosed embodiments will be apparent with regard to the following description, appended claims and accompanying drawings where:

DETAILED DESCRIPTION

The present disclosure is directed towards a structure for reducing ESD that may be drawn into a sensor by an approaching finger. Although reference is made to a fingerprint sensor herein, any sensor that comes into contact with electrostatically charged objects may be protected from ESD using a device designed according to the principles of the disclosed embodiments as will be apparent to one of ordinary skill in the art.

Figure 1:
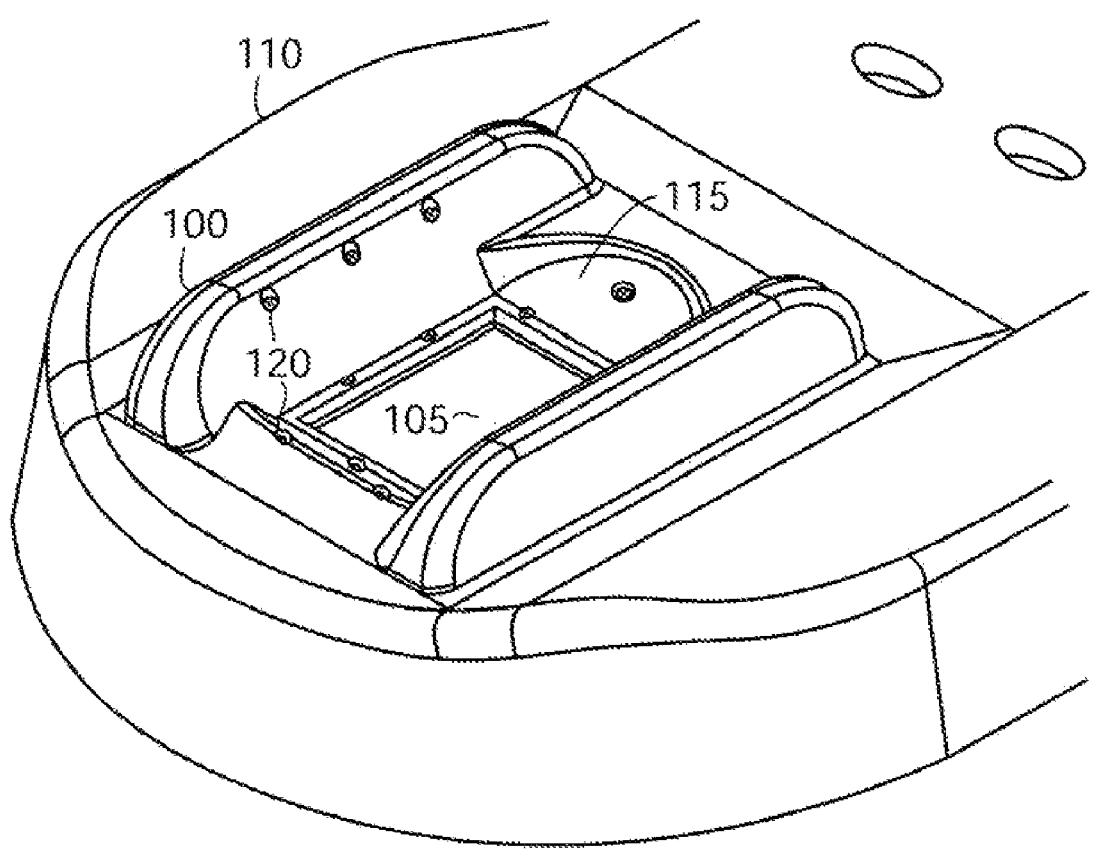
FIG. 1 depicts a molded structure with ports designed to reduce the amount of electrostatic buildup discharged to a platen according to an embodiment.
Figure 7:
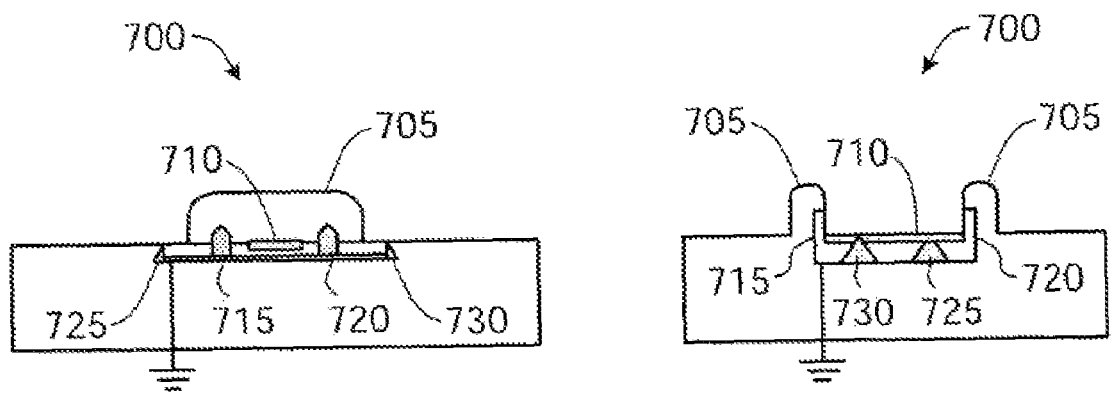
FIGS. 7 and 8 depict swipe sensors including exemplary electrostatic discharge structures according to embodiments.

FIG. 1 depicts an exemplary structure configured to reduce or eliminate the amount of electrostatic buildup discharged from a finger into a fingerprint sensor. As shown in the particular structure of FIG. 1, the raised molded structure 100 may be placed around the platen 105 of a fingerprint sensor 110. Those with ordinary skill in the art will recognize that such a structure 100 would be effective when used with a capacitive, piezoelectric, pyroelectric or any other electrically sensitive fingerprint, sensor. Such fingerprint sensors may take a variety of forms known to those of ordinary skill in the art, including, without limitation, area fingerprint sensors, such as the one 110 depicted in FIG. 1, and swipe fingerprint sensors, such as depicted in the embodiment of FIG. 7.

Figure 2:
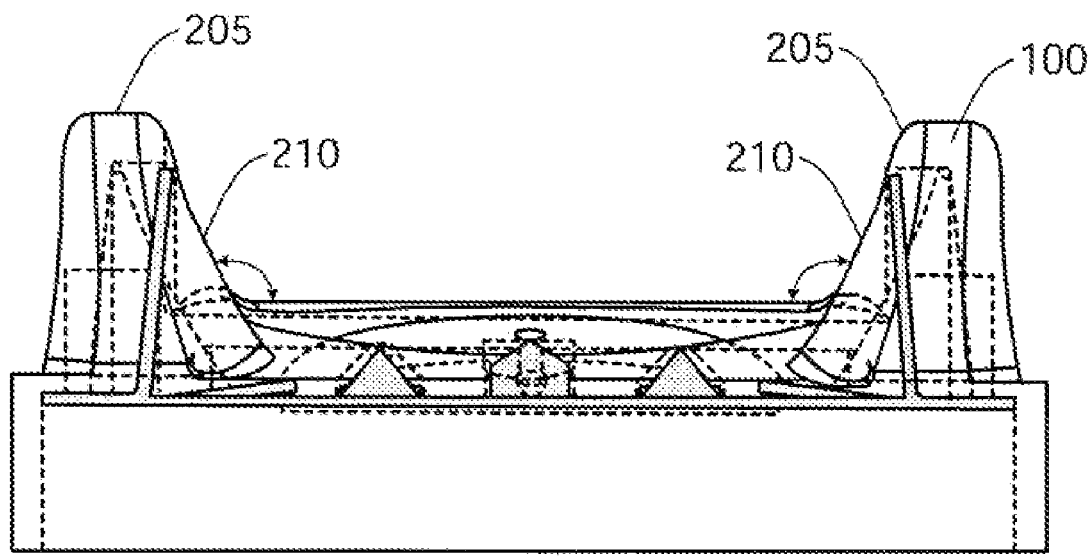
FIG. 2 depicts a top-side view of the molded structure.
Figure 3:
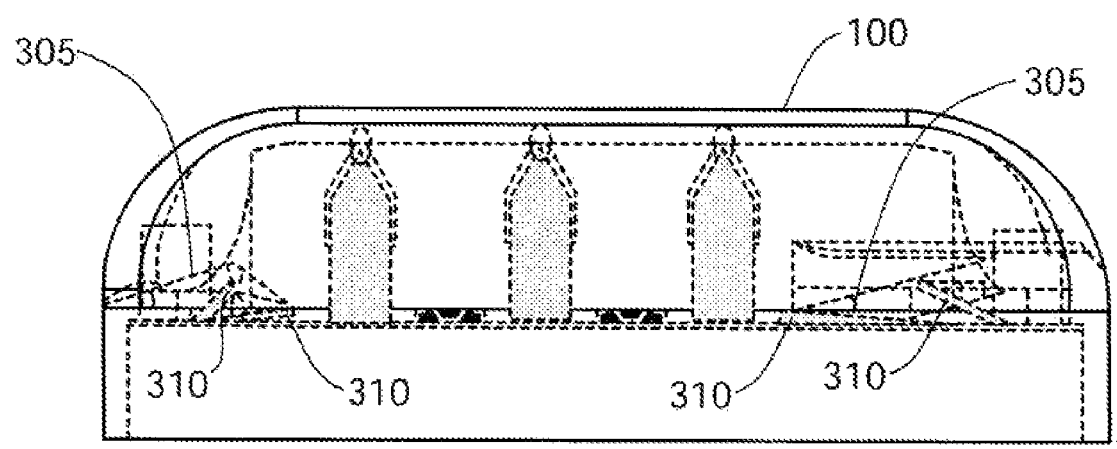
FIG. 3 depicts a lateral-side view of the molded structure.

The structure 100 may be mounted or otherwise affixed onto the fingerprint sensor 110 so that the position of the structure 100 with respect to the platen 105 is constant. The structure 100 may be designed in order to increase the probability that an approaching finger is nearer to the structure 100 than the platen 105 such that electrostatic buildup on the finger may be drawn towards the structure 100 rather than the platen 105 in accordance with the teachings herein but simultaneously does not cause an impediment for the finger to be placed on the sensor (e.g., create too narrow a channel for the finger to reach the platen 105, etc.). For example, in the particular embodiment of FIG. 2, the lateral walls 205 of the molded structure 100 are designed similarly to the walls of a slanted trough such that the internal sides 210 (i.e., closest to the platen 105) of the lateral walls 205 are angled slightly outwards. Such an angled design is intended to roughly approximate the contours and curvature of a finger such that as the finger approaches the platen 105, the distance of the approaching finger to the internal sides 210 of the structure 100 is anticipated to be less than the distance of the finger to the platen 105 (at least until the finger touches the platen 105 or is substantially close to touching the platen 105). Similarly, as depicted in FIG. 3, the top and bottom portions 305 of the structure 100 are also similarly inclined at a slight angle such that the base and top portions of the fingertip approach the top and bottom portions of the molded structure 100 and may ultimately touch such portions as the finger reaches the platen 105 or before the finger reaches the platen 105. The structure 100 may additionally be further economically designed to guide a user's finger into the platen 105 in an appropriate position. For example, as depleted in FIG. 1, the structure 100 may include a grooved fingertip area 115 to provide guidance for proper finger placement.

Figure 4:
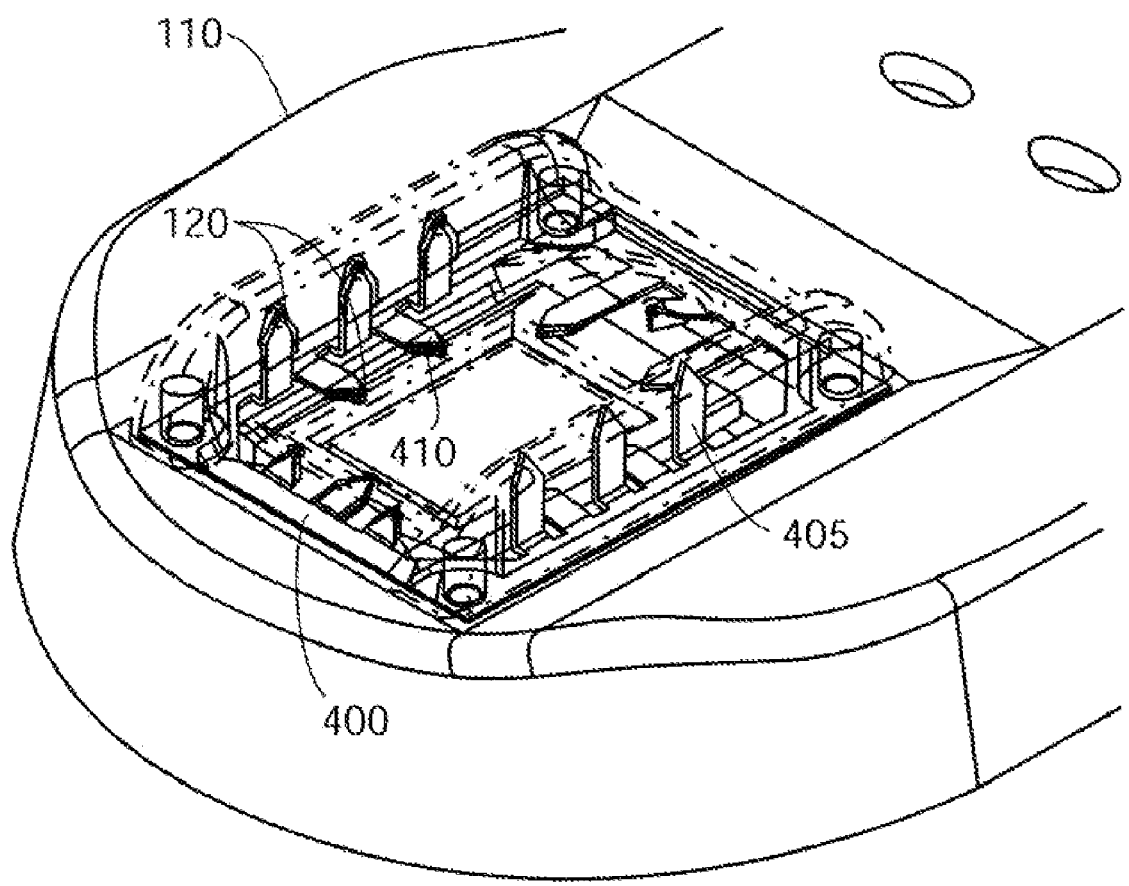
FIG. 4 depicts a frame including conductive structures placed under the molded structure according to an embodiment.
Figure 5:
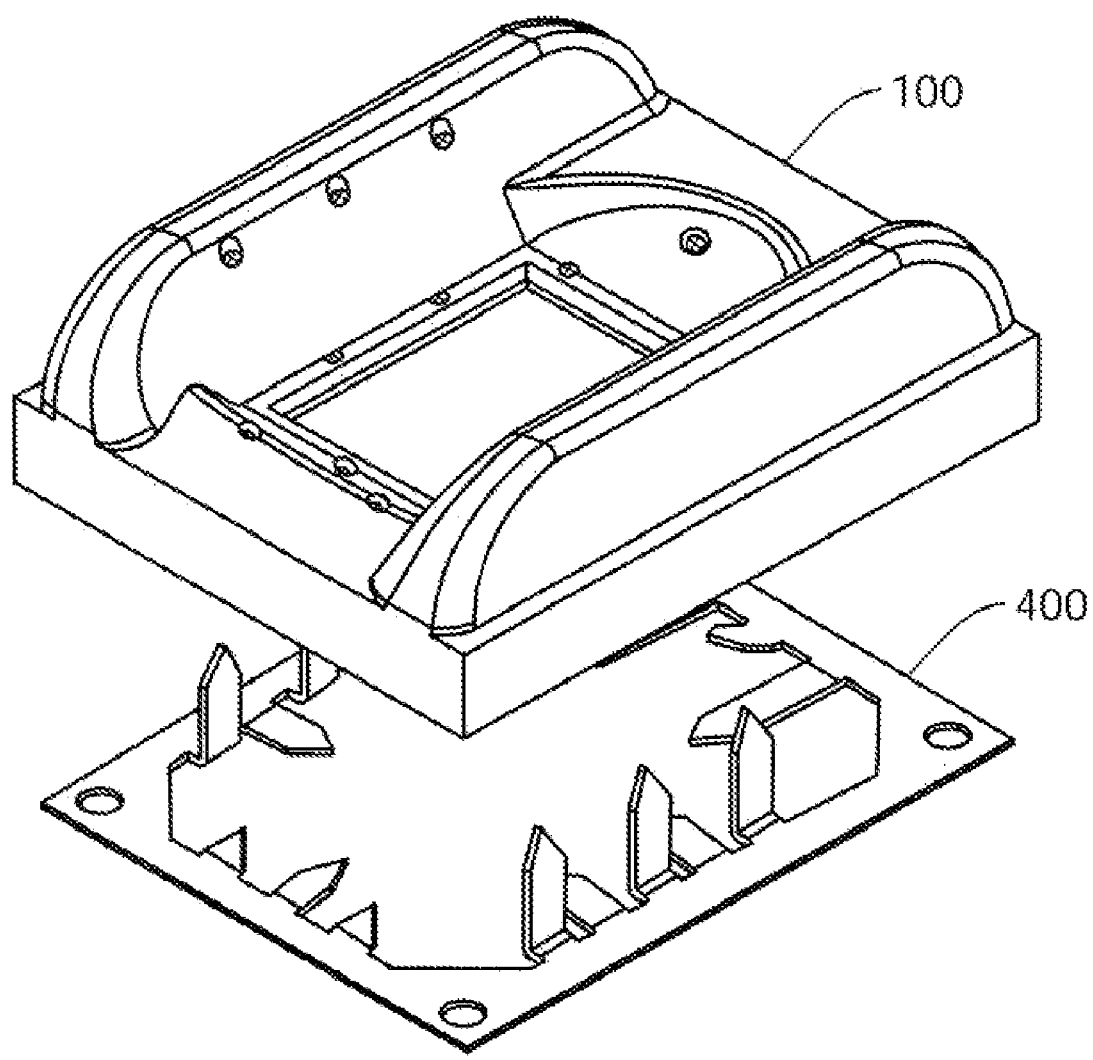
FIG. 5 depicts the molded structure and frame in an exploded and separated view.

As depicted in FIG. 4, a frame 400 comprising a plurality of conductive structures of varying lengths and angles, such as 405 and 410, is substantially covered by the structure 100. The frame 400 and its protruding conductive structures may comprise a metal or an alloy, such as aluminum or copper, or any other conductive materials known to those with ordinary skill in the art. Alternatively, a metallic coating or a coating comprising an alloy may be used to form an appropriate conductive structure if, for example, the portion of the conductive structure underlying the coating is not conductive. As depicted in the particular embodiment of FIG. 5, the frame 400 may be a separate component from the molded structure 100. The frame 400 and its conductive structures may be electrically connected to a ground voltage. For example and without limitation, the shield of a cable connected to the fingerprint sensor may be used as the ground. This connection may be internal to the fingerprint sensor 110, such as via a wire from one or more screws that affix the molded structure 100 to tire sensor housing to a direct connection to the cable shield. Alternatively, the ground path may also be connected externally to the fingerprint sensor 110 via a dedicated ground wire. The conductive structures of the frame 400 may have pointed tips as in FIG. 4 and may be positioned in various angular positions relative to the base of the frame 400 such that the tips of such conductive structures may slightly protrude though the various ports (e.g., slots or openings) in the molded structure 100, such as depicted in 120 of FIG. 1 and FIG. 4. Nevertheless, the pointed tips of the conductive structures may be substantially flush with the exterior surface of the molded structure 100 such that a user is unable to feel the pointed tips when a finger is placed on the surface of the structure 100. As shown in the particular embodiment of FIG. 4, the overall configuration of the conductive structures beneath the lateral walls 205 of the molded structure 100 may alternate between conductive structures in a raised position that are, for example, perpendicular or nearly perpendicular to the base of the frame 400 (such as 405) and conductive structures in a position prone and level or nearly prone and level with the frame 400 (such as 410). Similarly, the conductive structures beneath the top and bottom portions 305 are angled in such a manner as to also slightly protrude though ports 120 of the molded structure 100. Those with ordinary skill in the art will recognize that other angled configurations for conductive structures are possible within the scope of the present disclosure and that the shape and number of conductive structures used in any particular embodiment may differ from the shape and number shown in the particular embodiments represented by FIGS. 1 through 5 herein. For example and without limitation, conductive structures protruding from the internal sides 210 of the lateral walls 205 of the molded structure 100 may be at intermediate angles and with greater or lesser distances from the platen 105 than the depicted conductive structures 405 and 410.

As depicted in FIG. 1, the molded structure 100 may be made of material having a low dielectric constant. The dielectric constant is the ratio of the amount of electrical energy stored in a particular material, when a static electric field is imposed across it, relative to a vacuum. Accordingly, materials having low dielectric constants essentially act as a shield against electric fields. Creating the molded structure 100 with materials of low dielectric constant may improve the performance of ESD dissipation as taught herein because such materials will interfere less with the creation of high electric fields at the tips of the conductive structures that protrude through the structure 100. For example and without limitation, the molded structure 100 may be manufactured from a plastic having a dielectric constant in the range from about 1.5 to about 2.5, such as polypropylene and/of polytetrafluorocthylene. Other embodiments may utilize a material with, a higher dielectric constant such as aerylonitrile butadiene styrene ("ABS") plastic, which has a dielectric constant of 4.5. Those with ordinary skill in the art will recognize that the performance of the ESD dissipation as taught herein may depend upon the combination of the dielectric constant of material of the structure 100 as well as the placement of the conductive structures in relation to the structure 100. For example, for a structure 100 made of material with a higher dielectric constant, the performance of ESD dissipation may be better when the conductive structures protrude further out of the ports 120 and are exposed to the air since such an embodiment would decrease the interference of the material of the structure 100 with the electric fields created by the tips of the conductive structures. Similarly, those with ordinary skill in the art will recognize that a structure 100 made of a material with a very low dielectric constant (e.g., the dielectric constant of air) could obviate the need for creating the ports 120 from which the pointed tips of the conductive structures of the frame 400 can protrude in order to stimulate and encourage corona discharge and possible subsequent dielectric breakdown (i.e., arcing) as further detailed below. In such an embodiment, since the conductive structures would not protrude through the structure 100, the thinner the thickness of the walls of the structure (e.g., in the order of a few microns), the better the performance of corona discharge and possible dielectric breakdown through the thin walls of the structure 100 into the conductive structures.

Figure 6:
FIG. 6 depicts exemplary conductive structures according to embodiments.
Figure 6:
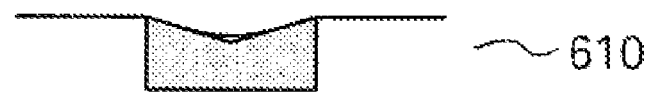
Figure 6:

As depicted in the particular embodiments of FIGS. 1 through 5, the tips of the conductive structures are pointed to stimulate or otherwise encourage corona discharge from a finger as it approaches the platen 105. As would be apparent to one of ordinary skill in the art, such pointed tips encourage the creation of localized high electric fields and as an electrically charged finger approaches the molded structure 100 (and therefore the ports 120 and tips of the conductive structures), local electric fields between the tip's of the conductive structures nearest to the finger and the finger may steadily increase. When an electric field reaches a sufficient level, an electrical arc (also known as dielectric breakdown) may result between the finger and at least one conductive structure, thereby dissipating ESD prior to the finger touching the platen 105. The ports 120 from which the conductive structures protrude are situated on the molded structure 100 in a manner so as to increase the probability that the various protruding conductive structures cause corona discharge and dielectric breakdown to be diverted from the platen 105 and directed towards the conductive structures. For example and without limitation, in the embodiments of FIGS. 1 through 5, the ports 120 that are intended to initially encourage corona discharge as a finger first approaches the platen 105 are those that are placed near the top of the molded structure 100 and are associated with the longest conductive structures 405 of the frame 400 which have been positioned, for example, nearly perpendicular to the base frame 400. As the finger passes through the initial horizontal plane created by the plateau of the lateral walls 205 and draws nearer to the platen 105 itself, the lower situated conductive structures 410 related to the lower ports 120 on the internal sides 210 of the lateral walls 205 and the conductive structures 310 of various lengths and angles protruding through the ports of the top and bottom portions 305 of molded structure 100 provide additional opportunities to attract and stimulate corona discharge and dielectric breakdown from the finger into such conductive structures prior to ultimate contact with the sensor. As further depicted in FIG. 6, those with ordinary skill in the art, consistent with the scope of the present disclosure, may envision alternative embodiments of the frame 400 that utilize different conductive structures having alternate and/or additional shapes with varying effect in dissipating ESD. For example and without limitation, rather than having conductive structures with points protruding through the center of the ports 120 as depicted in FIG. 1 through 5 and as detailed in 605, an alternative embodiment 610 may have two points from two conductive structures protruding through a single port, but positioned at the edges of the port such that the valley between the two conductive structures is centered over the center of the slot. In such an embodiment, because the points of the two conductive structures are tangent to, and in contact with, the inner wall of the port, they may be less exposed than a point protruding from the center of the port, thereby providing a smoother feel when a finger comes into contact with the port. Alternatively, rather than having pointed conductive structures protruding from the frame 400, an embodiment 610 may simply utilize a conductive bar that passes across the ports in the molded structure 100.

With respect to an embodiment that may be similar to the embodiments set forth in FIGS. 1 to 5, the tips of the raised conductive structures 405 may be, for example, approximately one-third of an inch above the platen 105 of the fingerprint sensor 110. The tips of the lowered conductive structures 410 may be, for example, approximately 0.02 inches above the platen 105 of the fingerprint sensor 110. A port 120 may be approximately 0.01 inches to approximately 0.05 inches in diameter and maybe any shape, such as circular, rectangular, or the like. Each port 120 exposes a portion (e.g., the point) of a conductive structure in order to stimulate corona discharge and dielectric breakdown into the conductive structure.

An additional enhancement to the ESD structure disclosed herein is to create an actively charged frame 400 by connecting the frame 400 to a voltage supply. The voltage applied by the voltage supply may be alternating current ("AC") or direct current ("DC") and is sufficient to cause free charges to emanate from the tips of the conductive structures via corona discharge. Using a DC voltage supply will produce either positively or negatively charged particles, depending on the polarity of the voltage supply. Using an AC voltage supply will produce both positively and negatively charged particles. In such an embodiment, as the finger approaches the vicinity of the charged pointed conductive structures, appropriately charged particles generated by the high electric fields at the points of the conductive structure will be attracted to a charged finger thereby canceling or counteracting the electric charge. If, for example, the finger is negatively charged, the free positive charges will be attracted to it, thereby canceling the negative charge on the finger, and the free negative charges will be repelled. In such an embodiment, the structure 100 surrounding the charged frame 400 may possess a number of ports or other openings or a grill or louvers in order to allow the charged particles to emanate from the frame's conductive structures through structure 100 and into the air in the vicinity of the approaching finger and near the surface of the platen. The number of conductive structures of the frame 400 may also be larger and the conductive structures may be more closely packed in a charged frame 400 embodiment as compared to non-charged frame embodiments as a larger number of charged conductive structures placed in a closely packed array increases the number of charged particles that may emanate from the tips of the conductive structures. In such an embodiment, the structure 100 may also serve a protective purpose by preventing or reducing the chance that a user receives an electric shock from the charged frame and conductive structures. As such, the conductive structures may be located a sufficient distance behind or under the walls of the protective structure 100 in order to eliminate or otherwise reduce the possibility of shock or arcing from the charged conductive structures to the user's approaching finger.

Figure 8:
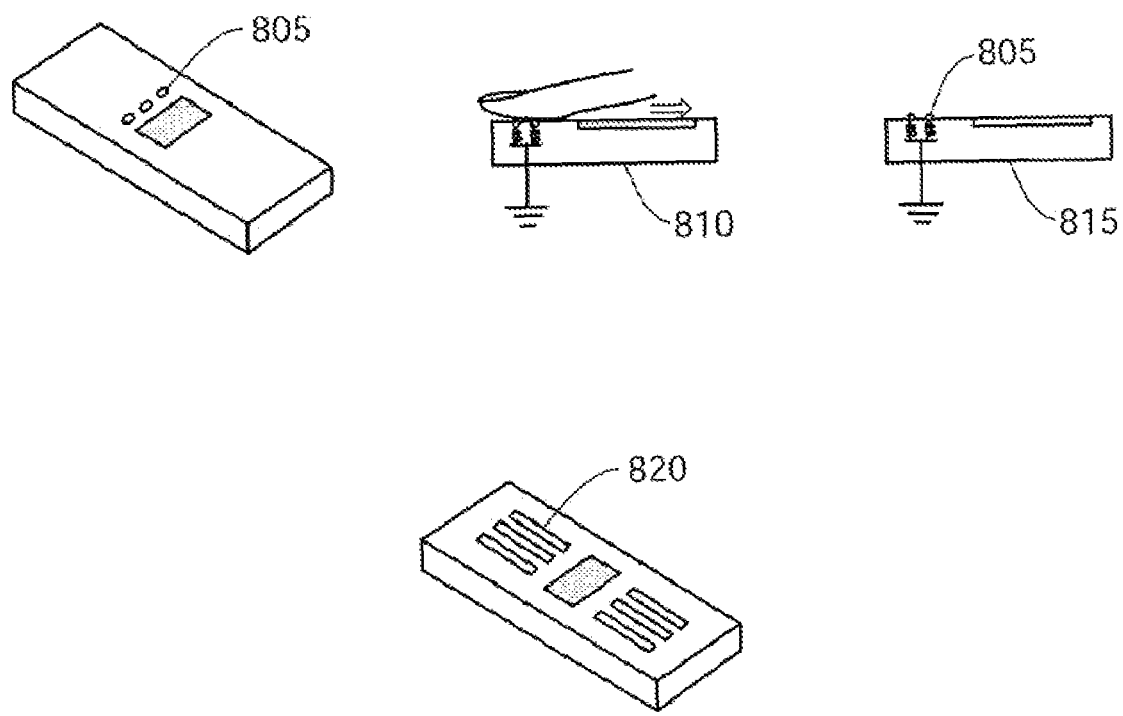

Although the present invention has been described with reference to the alternative embodiments, those of ordinary skill in the art will recognize that changes may be made in form and detail without departing from the spirit and scope of this disclosure. Terminology used in the foregoing descriptions is for the purpose of describing the particular versions or embodiments only, and is not intended to limit the scope of the present invention which will be limited only by the appended claims. For example, the present disclosure generally relates to providing systems for protecting a sensor from electrostatic energy from an object proximate to the sensor. While the term "sensor" is used throughout the disclosure, it is not meant to limit the disclosure to any particular type of sensor, such as a fingerprint sensor or an area sensor. A sensor could refer generally to any device that retrieves information. For example and without limitation, as depicted in FIG. 7, a swipe sensor may also include an electrostatic discharge structure as taught herein. The swipe sensor 700 may have a raised structure, as in the sensors described above in reference to FIGS. 1 through 5. However, rather than having the raised structure surround the platen on all sides, as in the area sensor embodiments used in FIGS. 1 to 5, an embodiment for a swipe sensor 700 may include only raised lateral side walls 705 formed as vanes on the sides of the platen 710 of the swipe sensor (the "swipe strip") that parallel the motion of a swiping finger. Each side wall 705 may include one or more conductive structures, such as 715 and 720. In addition, one or more conductive structures, such as 725 and 730, may be located within areas on either side of the swipe strip 710. During operation, a finger may be received in an area on one side of the swipe strip 710, drawn over the swipe strip and continue onto an area on the other side. An alternative swipe sensor embodiment, depicted in FIG. 8, may utilize small, raised and rounded conductive hemispheres 805 located in the molding surrounding the swipe stripe directly within the path of a swiping finger. In such an embodiment, as the finger approaches the swipe strip, the finger comes into direct contact with the conductive structures 805, thereby encouraging any charges present in the finger to flow into the conductive structures. The conductive structures 805 may be retractable. As such, as a finger contacts each conductive structure 805, the pressure from the finger presses the conductive structure into the molding, as depicted in 810, such that the top of the hemisphere is substantially flush and level to the surface of the sensor. When the finger no longer presses against a conductive structure 805, the structure may return to a raised position (i.e., slightly above the surface of the level swipe sensor), as depicted in 815. Similarly, an alternative swipe sensor embodiment may utilise slightly raised conductive strips 820 that are affixed to the surface of the swipe sensor and positioned directly in the path of a swiping finger. Such strips 820 may additionally assist in guiding the finger through the swipe strip.

As used herein and in the appended claims, the singular forms "a," "an" and "the" include plural references unless the context clearly dictates otherwise. Similarly, the words "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions, substitutions and the like can be made without departing from the spirit of the invention and these are therefore considered to be within the scope of the invention as defined in the following claims.

What is claimed is:

1. An apparatus configured to reduce the amount of electrostatic discharge received through a platen of a sensor, the apparatus comprising:
   a raised molded structure physically proximate to the platen;
   a frame comprising a plurality of conductive structures affixed underneath the raised molded structure, wherein at least a portion of the conductive structures are substantially flush against the surface of the raised molded structure; and
   a voltage supply coupled to the frame, whereby the conductive structures are charged to release charged particles into the air surrounding the platen,
   wherein the raised molded structure is configured to discourage electrostatic discharge into the platen from an approaching charged object by encouraging electrostatic discharge from the object into the frame.

2. The apparatus of claim 1 wherein the frame is connected to ground.

3. The apparatus of claim 1 wherein the raised molded structure further comprises a plurality of ports, wherein each port is configured to receive an end of a corresponding one of the plurality of conductive structures.

4. The apparatus of claim 1 wherein each conductive structure has a pointed tip at an end closest to the surface of the raised molded structure.

5. The apparatus of claim 1 wherein each conductive structure comprises a metal.

6. The apparatus of claim 1 wherein the positions of the plurality of conductive structure alternate between raised positions that are nearly perpendicular to the base of the frame and prone positions that are nearly level with the frame.

7. The apparatus of claim 1 wherein the raised molded structure comprises a plastic.

8. The apparatus of claim 1 wherein the raised molded structure has a dielectric constant between 1.5 and 2.5.

9. A method for reducing the amount of electrostatic discharge received by a platen of a fingerprint sensor prior to an approaching finger touching the platen, the method comprising:
   directing a current into a plurality of conductive structures proximate to the platen through a coupled voltage supply; and
   emitting free charges from the conductive structures via corona discharge into the air above the platen, thereby canceling any charge in the approaching finger as the approaching finger passes through the air above the platen.

10. The method of claim 9 wherein the conductive structures are covered with a molded structure.

11. The method of claim 9 wherein each conductive structure has a pointed tip at an end within a port.

12. A biometric sensor configured to reduce the amount of electrostatic discharge, the sensor comprising:
    a platen configured to receive biometric information;
    a structure configured to reduce the amount of electrostatic discharge received by the platen, wherein the structure comprises a plurality of conductive structures and a covering, and wherein an end portion of each conductive structure is substantially flush against a surface of the covering; and
    a voltage supply coupled to the plurality of conductive structures, whereby the plurality of conductive structures are charged to release charged particles into the air surrounding the platen.

13. The biometric sensor of claim 12 wherein each conductive structure is electrically connected to a ground source.

14. The biometric sensor of claim 12 wherein the end portion of each conductive structure has a pointed shape.

15. The biometric sensor of claim 12 wherein the covering has a dielectric constant between 1.5 and 2.5.

16. The biometric sensor of claim 12 wherein the surface of the covering comprises a plurality of ports, wherein each port corresponds to and is configured to receive a conductive structure.

17. The biometric sensor of claim 12 wherein each conductive structure comprises a metal.

18. The biometric sensor of claim 12 wherein the covering comprises a plastic.

19. The biometric sensor of claim 12 wherein the biometric sensor is a capacitive sensor.

20. The biometric sensor of claim 12 wherein the biometric sensor is a swipe sensor.

21. The biometric sensor of claim 12 wherein the platen comprises one or more of a pyroelectric surface and a piezoelectric surface.

* * * * *